United States Patent [19]
SanGregory

[11] Patent Number: 5,602,604
[45] Date of Patent: Feb. 11, 1997

[54] UNDERWATER ONE-TIME-USE CAMERA WITH COMBINATION FILM WINDING CLUTCH AND SHUTTER RELEASE

[75] Inventor: Jude A. SanGregory, Spenceport, N.Y.

[73] Assignee: Eastman Kodak Company, Rochester, N.Y.

[21] Appl. No.: 597,764

[22] Filed: Feb. 7, 1996

[51] Int. Cl.⁶ .......................... G03B 17/08; G03B 17/42; G03B 1/10
[52] U.S. Cl. .................................. 396/25; 396/6; 396/395
[58] Field of Search .............................. 354/64, 204, 206, 354/213

[56] References Cited

U.S. PATENT DOCUMENTS

| | | | |
|---|---|---|---|
| 2,404,291 | 7/1946 | Hunter | 242/71 |
| 3,138,084 | 6/1964 | Harvey | 95/31 |
| 3,653,306 | 4/1970 | Takahama | 95/11 |
| 3,659,798 | 5/1972 | Mindler et al. | 242/71.3 |
| 3,722,388 | 3/1993 | Winkler | 95/31 |
| 3,757,660 | 9/1973 | Kuramoto et al. | 95/31 |
| 3,831,881 | 8/1974 | Tucker | 242/194 |
| 4,949,111 | 8/1990 | Alligood | 354/213 |
| 5,235,366 | 8/1993 | Kucmerowski | 354/212 |
| 5,239,324 | 8/1993 | Ohmura et al. | 354/64 |
| 5,285,894 | 2/1994 | Kamata et al. | 206/316.1 |
| 5,452,033 | 9/1995 | Balling et al. | 354/212 |
| 5,510,866 | 2/1995 | Solomon et al. | 354/204 |

FOREIGN PATENT DOCUMENTS 7-168265  7/1995  Japan .............................. G03B 17/08

*Primary Examiner*—Safet Metjahic
*Assistant Examiner*—John Chizuar
*Attorney, Agent, or Firm*—Roger A. Fields

[57] ABSTRACT

A camera comprises a film winding knob manually rotatable to rotate a spool to wind a filmstrip onto the spool, a clutching mechanism located between the film winding knob and the spool for allowing the film winding knob to be manually rotated without rotating the spool, and a shutter release button manually depressible to initiate picture-taking. The clutching mechanism includes a clutch component supported to be depressed to initiate picture-taking responsive to manual depression of the shutter release button.

9 Claims, 4 Drawing Sheets

UNDERWATER ONE-TIME-USE CAMERA WITH COMBINATION FILM WINDING CLUTCH AND SHUTTER RELEASE

FIELD OF THE INVENTION

The invention relates generally to the field of photography, and in particular to cameras. More specifically, the invention relates to an underwater one-time-use camera with a combination film winding clutch and shutter release.

BACKGROUND OF THE INVENTION

Film and cameras that are all in one, commonly referred to as one-time-use or single-use cameras, have recently become well known. Typically, the one-time-use camera is a simple point-and-shoot type comprising a plastic main body portion which supports a fixed-focus taking lens, a film metering mechanism, a manual film advance thumbwheel, a single-blade shutter, a manual shutter release button, a frame counter for indicating the number of exposures remaining for picture-taking, and a direct see-through viewfinder. Front and rear plastic cover portions house the main body portion between them to form a light-tight camera unit. A decorative cardboard outer box contains the camera unit and has respective openings for the taking lens, the shutter release button, the film advance thumbwheel, the viewfinder, and the frame counter.

At the manufacturer, the main body portion is loaded with a conventional 12, 24, or 36 exposure 35 mm film cartridge and the front and rear cover portions are connected to each other and/or to the main body portion to assemble the light-tight camera unit. Then, an exposed end of a supply spool in the main body portion is rotated to factory prewind substantially the entire length of the unexposed filmstrip from the cartridge onto the supply spool. Lastly, the outer box is placed on the camera unit.

During picture-taking, after the photographer takes a picture, he or she manually rotates the thumbwheel in engagement with a take-up spool inside the cartridge to rewind the exposed frame into the cartridge. The rewinding movement of the filmstrip the equivalent of slightly more than one frame width rotates a metering sprocket in engagement with the filmstrip, to decrement the frame counter to its next lower-numbered setting and to pivot a metering lever into engagement with the thumbwheel to prevent further manual rotation of the thumbwheel. Manually depressing the shutter release button to take a picture pivots the metering lever out of engagement with the thumbwheel. When the maximum number of exposures available on the filmstrip are exposed and the filmstrip is completely rewound into the cartridge, the one-time-use camera is given to a photofinisher who tears the outer box off the camera unit, separates the rear cover portion from the main body portion, and removes the cartridge with the filmstrip from the main body portion. Then, he removes the filmstrip from the cartridge to develop the negatives and make prints for the customer, and he forwards the used camera parts to the manufacturer for recycling, i.e. remanufacture.

Fairly recently, one-time-use cameras have been proposed which are encased in a transparent watertight housing for picture-taking underwater. A manually rotatable film winding knob is located on the watertight casing and is rotationally coupled to the thumbwheel in order to rotate the thumbwheel, as in prior art U.S. Pat. No. 5,239,324, issued Aug. 24, 1993. The film winding knob is relatively large to permit it to be readily gripped and rotated underwater. This gives rise to the possibility that one might rotate the film winding knob even though the metering lever is positioned in engagement with the thumbwheel to prevent rotation of the thumbwheel. Consequently, the film metering mechanism may be broken. To prevent this problem, Japan Kokai NO. 7-168265, published Jul. 4, 1995, suggests including a toothed face clutch between the film winding knob and the thumbwheel.

Separately, in Japan Kokai No. 7-168265, a flexible shutter release button is located on the watertight housing which is to be manually depressed to in turn depress the camera shutter release button.

SUMMARY OF THE INVENTION

According to one aspect of the invention, a camera comprising a film winding knob manually rotatable to rotate a spool to wind a filmstrip onto the spool, clutching means located between the film winding knob and the spool for allowing the film winding knob to be manually rotated without rotating the spool, and a shutter release button manually depressible to initiate picture-taking, is characterized in that:

the clutching means includes a clutch component supported to be depressed to initiate picture-taking responsive to manual depression of the shutter release button.

Preferably, the camera includes a film winding thumbwheel manually rotatable in engagement with the spool to rotate the spool and film metering means which can engage the thumbwheel to prevent rotation of the thumbwheel. An outer watertight housing encases the camera. The film winding knob and the shutter release button are located on the watertight housing in coaxial relation with the film winding thumbwheel. The clutch component engages the film winding knob and the film winding thumbwheel to make manual rotation of the knob rotate the clutch component to in turn rotate the thumbwheel. However, the clutch component disengages from the film winding knob and/or the film winding thumbwheel when the film metering means engages the thumbwheel, to permit the knob to be manually rotated without rotating the thumbwheel. This is a much simpler arrangement than is disclosed in the known prior art.

According to another aspect of the invention, a watertight housing for encasing a camera comprises a film winding knob manually rotatable to rotate a spool to wind a filmstrip onto the spool in the camera, clutching means located between the film winding knob and the spool for allowing the film winding knob to be manually rotated without rotating the spool, and a shutter release button manually depressible to initiate picture-taking with the camera, and is characterized in that:

the clutching means includes a clutch component supported to be depressed to initiate picture-taking with the camera responsive to manual depression of the shutter release button.

Preferably, for the watertight housing, the shutter release button, the film winding knob and the clutch component are arranged in coaxial relation.

DETAILED DESCRIPTION OF THE INVENTION

The invention is disclosed as being embodied preferably in an underwater one-time-use camera. Because the features of an underwater one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
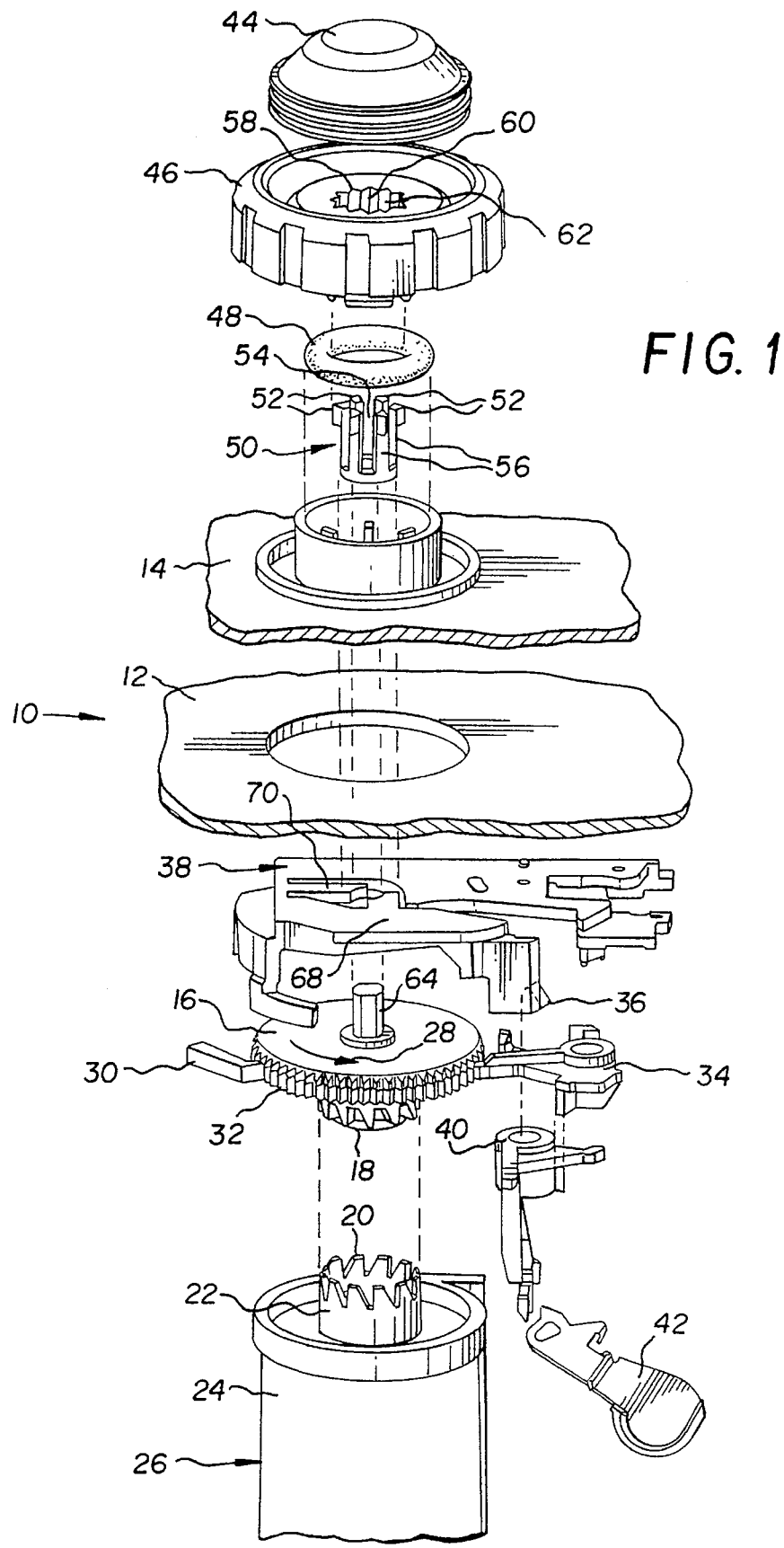
FIG. 1 is an exploded, perspective, partial view of an underwater one-time-use camera with a combination film winding clutch and shutter release in accordance with the invention.

Referring now to the drawings, FIG. 1 partially shows an underwater one-time-use camera 10 which comprises an opaque plastic camera housing 12 encased in a transparent plastic watertight housing 14. For the sake of simplicity, FIG. 1 only depicts a top portion of the camera housing 12 and a top portion of the watertight housing 14.

Figure 2:
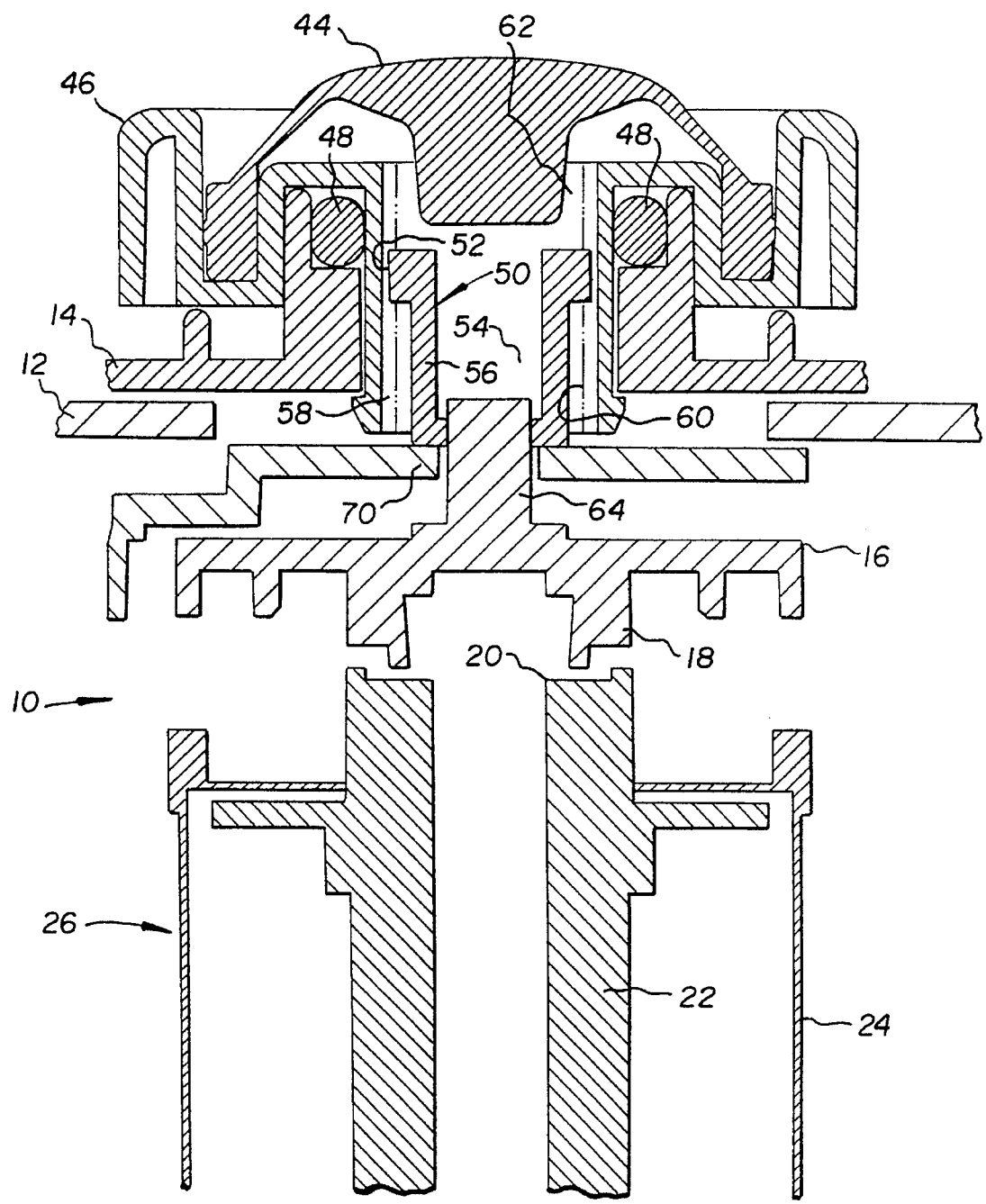
FIG. 2 is a sectional view of the underwater one-time-use camera.

Looking into the camera housing 12, in FIGS. 1 and 2, one can see a thumbwheel 16 intended to partially protrude from the camera housing and which has a depending toothed driver 18 located in coaxial engagement with a protruding toothed end 20 of a spool 22 rotatably supported inside a lighttight shell 24 of a known 35 mm film cartridge 26. As is known, the thumbwheel 16 is to be rotated in a winding direction 28 in FIG. 1 to wind an exposed frame of a filmstrip, not shown, onto the spool 22 in the shell 24 following each exposure. An anti-backup pawl 30 engages a toothed periphery 32 of the thumbwheel 16 to prevent the thumbwheel from being rotated in a direction opposite to the winding direction 28. A metering lever 34 is spring-pivoted clockwise in FIG. 1 to engage the toothed periphery 32 of the thumbwheel 16 to prevent the thumbwheel from being rotated in the winding direction 28. A latch 36 projecting from a keeper plate 38 engages a high energy lever 40 to prevent the high energy lever from being spring-pivoted counter-clockwise in FIG. 1 against a shutter blade 42, to pivot the shutter blade clockwise in FIG. 1 to momentarily uncover a taking lens, not shown, to initiate picture-taking, and against the metering lever 34, to pivot the metering lever counter-clockwise in FIG. 1 out of engagement with the toothed periphery 32 of the thumbwheel 16.

As shown in FIGS. 1 and 2, a manually depressible rubber shutter release button 44 is fitted coaxially within a manually rotatable film winding knob 46 rotatably supported on the outside of the watertight housing 14. A water-sealing rubber o-ring 48 is located between the knob 46 and the watertight housing 14.

Figure 3:
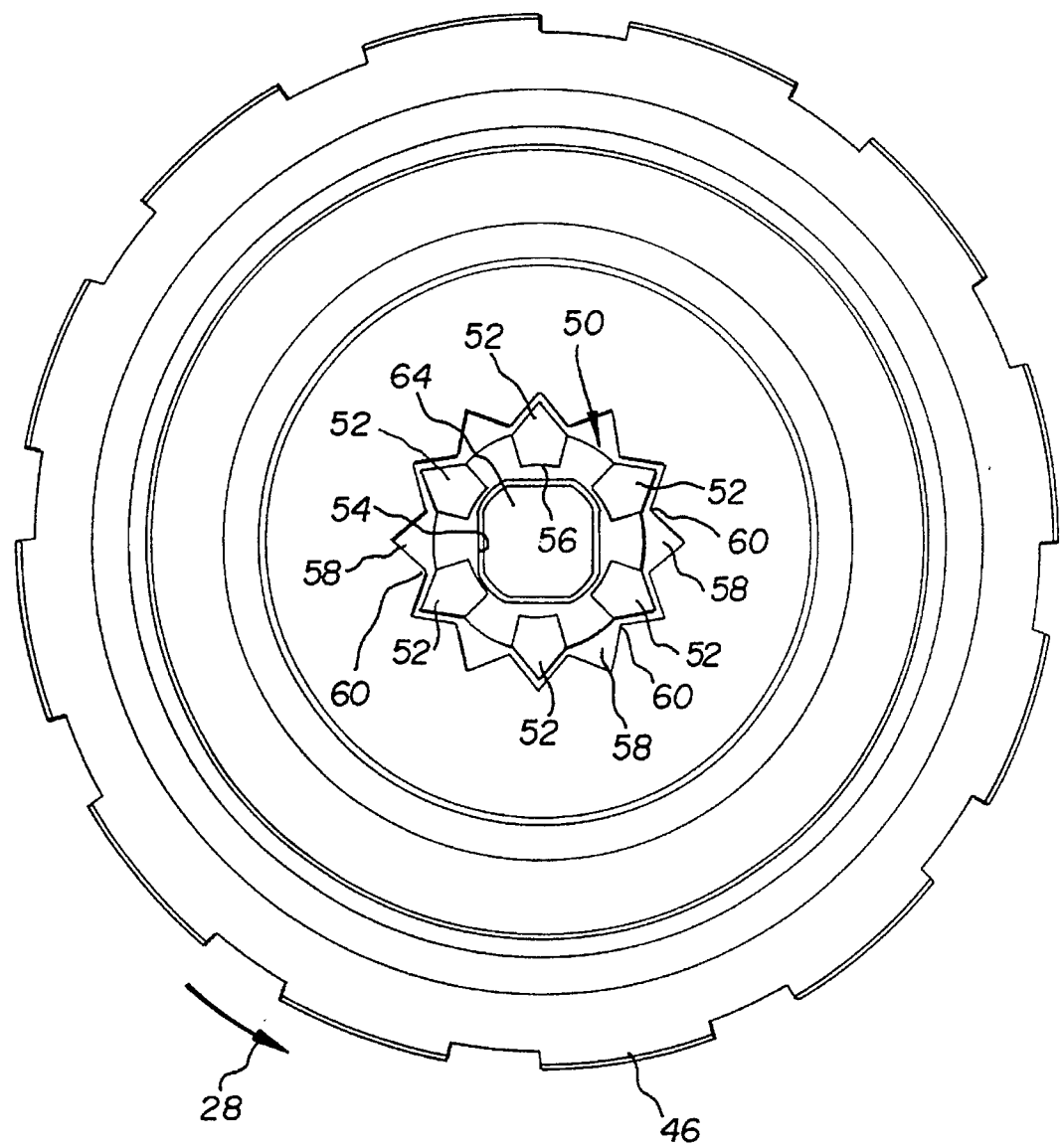
FIG. 3 is a top plan view of a camera portion, shown with a shutter release button removed.
Figure 4:
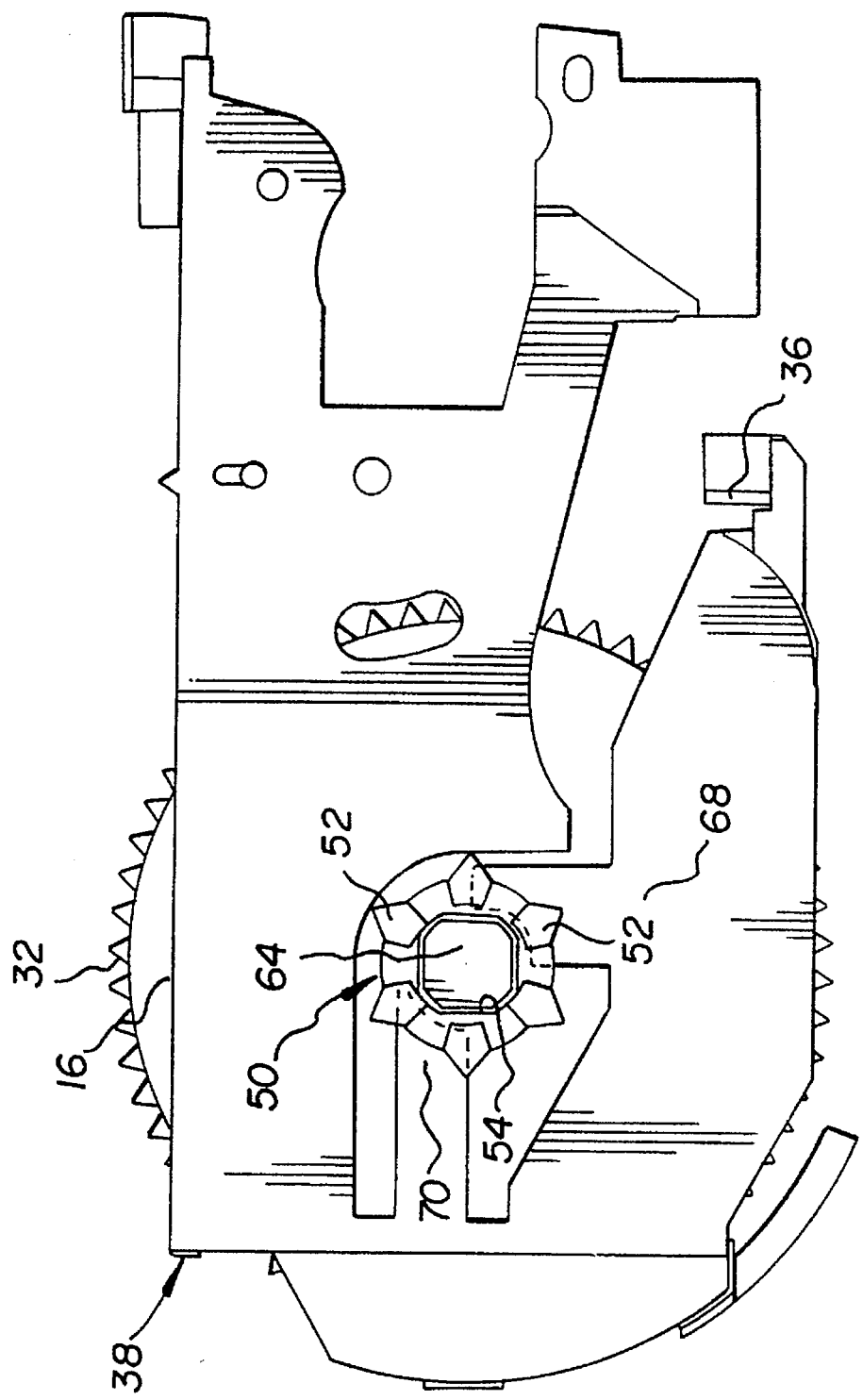
FIG. 4 is a top plan view of a camera portion, shown generally at an interior keeper plate.

The shutter release button 44 and the film winding knob 46 are located in coaxial relation with the thumbwheel 16. See FIG. 1. A plunger 50 has a circular array of six teeth 52 that project radially outwardly from a central opening 54 in the plunger. The six teeth 52 extend from respective flexible beams 56 of the plunger 50 that surround the central opening 54. The six teeth 52 are configured to fit into every other one of twelve spaces 58 between corresponding teeth 60 of the film winding knob 46 that project radially inwardly into a central opening 62 in the knob as shown in FIG. 3, to windingly engage the plunger 50 and the film winding knob. An upstanding pin 64 projects from the thumbwheel 16 slightly into the central opening 54 in the plunger 50 as shown in FIG. 2, to rotationally (but not translationally) fix the plunger to the thumbwheel.

When the shutter release button 44 is manually depressed, a depending stem 66 of the button slightly depresses the plunger 50 downwardly in FIGS. 1 and 2. This occurs without the teeth 52 of the plunger 50 being removed from every other one of the spaces 58 between corresponding teeth 60 of the film winding knob 46 and without the plunger bottoming out along the pin 64 of the thumbwheel 16. See FIG. 2. The plunger 50, however, is depressed sufficiently to bear against a flexible portion 68 of the keeper plate 38 to bend the flexible portion to disengage the latch 36 from the high energy lever 40. The high energy lever 40 then is spring-pivoted counter-clockwise in FIG. 1 against the shutter blade 42 to pivot the shutter blade clockwise in FIG. 1 to momentarily uncover the taking lens to initiate picture-taking, and against the metering lever 34, to pivot the metering lever counter-clockwise in FIG. 1 out of engagement with the toothed periphery 32 of the thumbwheel 16. Another flexible portion 70 of the keeper plate 38 acts as a return spring for the plunger 50 to lift the plunger to its original position in FIG. 2. The shutter release button 44 returns to its original position in FIG. 2 by virtue of its resiliency.

When the metering lever 34 is disengaged from the toothed periphery 32 of the thumbwheel 16 to allow winding rotation of the thumbwheel, manual rotation of the film winding knob 46 in the winding direction 28 similarly rotates the plunger 50 to, in turn, similarly rotate the thumbwheel to wind an exposed frame of the filmstrip onto the spool 22 in the shell 24.

Conversely, when the metering lever 34 is engaged with the toothed periphery 32 of the thumbwheel 16 to prevent winding rotation of the thumbwheel, manual rotation of the film winding knob 46 in the winding direction 28 will not rotate the plunger 50. Instead, the flexibility of the beams 56 allows the six teeth 52 to hop from every other one of the twelve spaces 58, over the twelve teeth 60, and into the next successive spaces, to periodically disengage the plunger 50 and the film winding knob 46. See FIG. 3.

If the film winding knob 46 is rotated in a direction opposite to the winding direction 28, the thumbwheel 16 is prevented from being similarly rotated due to engagement of the anti-backup pawl 30 with the toothed periphery 32 of the thumbwheel. Instead, the flexibility of the beams 56 allows the six teeth 52 to hop from every other one of the twelve spaces 58, over the twelve teeth 60, and into the next successive spaces, to periodically disengage the plunger 50 and the film winding knob 46.

The invention has been described with reference to a preferred embodiment. However, it will be appreciated that variations and modifications can be effected by a person of ordinary skill in the art without departing from the scope of the invention. For example, instead of the clutching mechanism comprising the beams 56, the teeth 52, the spaces 58 and the teeth 60, a friction-slip clutch or other type clutch may be used.

PARTS LIST 10. one-time-use camera
12. camera housing
14. watertight housing
16. thumbwheel 18. depending toothed driver
20. protruding toothed end
22. spool
24. shell
26. film cartridge
28. winding direction
30. anti-backup pawl
32. toothed periphery
34. metering lever
36. latch
38. keeper plate
40. high energy lever
42. shutter blade
44. shutter release button
46. film winding knob
48. o-ring
50. plunger
52. six teeth
54. central opening
56. six flexible beams
58. twelve spaces
60. twelve teeth
62. central opening
64. upstanding pin
66. depending stem
68. flexible portion
70. flexible portion

I claim:

1. A camera comprising a film winding knob manually rotatable to rotate a spool to wind a filmstrip onto the spool, clutching means located between said film winding knob and the spool for allowing the film winding knob to be manually rotated without rotating the spool, and a shutter release button manually depressible to initiate picture-taking, is characterized in that:

said clutching means includes a clutch component supported to be depressed to initiate picture-taking responsive to manual depression of said shutter release button.

2. A camera as recited in claim 1, wherein resilient means urges said clutch component against said shutter release button to make manual depression of the shutter release button depress the clutch component.

3. A camera as recited in claim 2, wherein a latch restrains a high energy actuator from striking a shutter blade to initiate picture-taking, and said clutch component is supported to move said latch to release said high energy actuator responsive to manual depression of said shutter release button.

4. A camera as recited in claim 1, wherein a film winding thumbwheel is manually rotatable in engagement with the spool to rotate the spool and film metering means can engage the thumbwheel to prevent rotation of the thumbwheel, an outer watertight housing encases said camera, said film winding knob and said shutter release button are located on said watertight housing in coaxial relation with said film winding thumbwheel, and said clutch component engages said film winding knob and said film winding thumbwheel to make manual rotation of the knob rotate the clutch component to in turn rotate the thumbwheel but which can disengage the knob and/or the thumbwheel when said film metering means engages the thumbwheel to permit the knob to be manually rotated without rotating the thumbwheel.

5. A camera as recited in claim 4, wherein said clutching means includes a circular array of teeth projecting from said film winding knob into a central opening in the knob and a mating array of teeth projecting from said clutch component into engagement with said circular array of teeth in said central opening to make manual rotation of the knob rotate the clutch component, and at least one of said arrays of teeth being constructed to displace the other when said film metering means engages said film winding thumbwheel to permit said film winding knob to be manually rotated without rotating the thumbwheel.

6. A camera as recited in claim 5, wherein said teeth projecting from said clutch component are supported on respective flexible beams of the clutch component to allow said teeth projecting from said film winding knob to displace the teeth projecting from the clutch component when said film metering means engages said film winding thumbwheel.

7. A camera as recited in claim 1, wherein said shutter release button, said film winding knob and said clutch component are arranged in coaxial relation.

8. A watertight housing for encasing a camera comprises a film winding knob manually rotatable to rotate a spool to wind a filmstrip onto the spool in the camera, clutching means located between said film winding knob and the spool for allowing the film winding knob to be manually rotated without rotating the spool, and a shutter release button manually depressible to initiate picture-taking with the camera, is characterized in that:

said clutching means includes a clutch component supported to be depressed to initiate picture-taking with the camera responsive to manual depression of said shutter release button.

9. A watertight housing as recited in claim 8, wherein said shutter release button, said film winding knob and said clutch component are arranged in coaxial relation.

* * * * *